United States Patent
Yang et al.

(10) Patent No.: US 10,061,717 B1
(45) Date of Patent: Aug. 28, 2018

(54) STORING MULTIPLE ENCRYPTION KEYS TO PROTECT DATA AT REST

(71) Applicant: EMC Corporation, Hopkinton, MA (US)

(72) Inventors: Lifeng Yang, Beijing (CN); Xinlei Xu, Beijing (CN); Jian Gao, Beijing (CN); Lili Chen, Hopkinton, MA (US); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 15/081,167

(22) Filed: Mar. 25, 2016

(51) Int. Cl.
| | |
|---|---|
| H04L 29/06 | (2006.01) |
| H04L 9/32 | (2006.01) |
| G06F 12/14 | (2006.01) |
| G06F 7/04 | (2006.01) |
| H04L 9/08 | (2006.01) |
| H04L 9/14 | (2006.01) |
| G06F 12/1009 | (2016.01) |

(52) U.S. Cl.
CPC ...... *G06F 12/1408* (2013.01); *G06F 12/1009* (2013.01); *H04L 9/0822* (2013.01); *H04L 9/14* (2013.01); *G06F 2212/1052* (2013.01); *G06F 2212/402* (2013.01)

(58) Field of Classification Search
CPC ............. G06F 12/1408; G06F 12/1009; G06F 2212/402; G06F 2212/1052; H04L 9/14; H04L 9/0822

USPC .................. 713/193, 165, 171, 189; 726/26; 380/278
See application file for complete search history.

(56) References Cited

U.S. PATENT DOCUMENTS

| | | | |
|---|---|---|---|
| 6,611,194 B1 * | 8/2003 | Vieweg | H04L 9/083 340/5.1 |
| 2010/0054461 A1 * | 3/2010 | Ciet | H04L 9/002 380/29 |
| 2010/0191981 A1 * | 7/2010 | Obuchi | G06F 21/80 713/189 |
| 2013/0124943 A1 * | 5/2013 | Mateescu | G06F 11/1008 714/766 |
| 2015/0220751 A1 * | 8/2015 | Syben | G06F 21/6227 713/193 |
| 2016/0062914 A1 * | 3/2016 | Um | G06F 17/30008 711/104 |
| 2016/0300073 A1 * | 10/2016 | Pomeroy | G06F 21/6227 |
| 2016/0321376 A1 * | 11/2016 | Taylor | G06F 17/30958 |
| 2017/0124329 A1 * | 5/2017 | Ghafoor | G06F 21/575 |
| 2017/0141916 A1 * | 5/2017 | Zhang | H04L 9/0891 |

* cited by examiner

*Primary Examiner* — Aravind K Moorthy
(74) *Attorney, Agent, or Firm* — BainwoodHuang

(57) ABSTRACT

Techniques of protecting data involve storing a data structure in a data storage system that associates indices with respective keys. In this data structure, each index corresponds to a point in time when a respective key was put into effect. Each key may then be used to decrypt data stored in the data storage system that was encrypted during a time interval following the point in time when the respective key was put into effect, but before a later key was put into effect. During a key update process, a new key is put into effect and a new entry is created in the data structure that associates a new index with the new key.

19 Claims, 5 Drawing Sheets

STORING MULTIPLE ENCRYPTION KEYS TO PROTECT DATA AT REST

BACKGROUND

Data accessible from a data storage system may be considered as being in one of three states: at rest, in motion, or in use. Data at Rest is inactive data stored physically in databases, data warehouses, spreadsheets, archives, tapes, off-site backups, etc. Data in Motion is data that is traversing a network or temporarily residing in computer memory to be read or updated. Data in Use means active data under change stored physically in databases, data warehouses, etc.

Data in motion and data at rest are typically encrypted using a cryptographic key. The key may be a symmetric key or part of an encryption/decryption key pair.

A conventional approach to protecting data at rest in a storage system using cryptographic keys involves periodically updating the keys used for encrypting and decrypting the data. For example, a data storage system may either generate or otherwise acquire a new cryptographic key or key pair. The data storage system decrypts the data using the old key and re-encrypts the data using the new key.

SUMMARY

Unfortunately, there are deficiencies with the above-described conventional approach to protecting data at rest. For example, the key updating process involves decrypting data stored with an old key and then re-encrypting the data with a new key. Such activity becomes unwieldy when a data storage system stores a large amount of data at rest, as each key update may require an enormous amount of computational resources. Thus, periodic key updates for data at rest may be excessively burdensome.

In contrast with the above-described conventional approach, which can be burdensome, improved techniques of protecting data involve storing a data structure that associates indices with respective keys. In this data structure, each index corresponds to a point in time when a respective key was put into effect. Each key may then be used to decrypt data stored in the data storage system that was encrypted during a time interval following the point in time when the respective key was put into effect, but before a later key was put into effect. During a key update process, a new key is put into effect and a new entry is created in the data structure that associates a new index with the new key.

Advantageously, the improved techniques allow for periodic updating of the keys without performing expensive decryption/encryption operations on data at rest. Rather, each key in the data structure can decrypt data stored during a respective time interval but not during other time intervals. In some examples, security of data at rest is further enhanced by encrypting keys stored in the data structure using a second key, which is periodically updated.

One embodiment of the improved techniques is directed to a method of managing data at rest within a data storage system. The method includes storing a data structure that associates indices with respective keys, each of the indices corresponding to a point in time when the respective key was put into effect, each of the keys configured to decrypt respective data stored in the data storage system during a respective time interval following the time the respective key was put into effect. The method also includes receiving a new key to be used for decrypting new data to be stored by the data storage system going forward. The method further includes putting the new key into effect by creating a new entry in the data structure for the new key, the new entry having an index in the data structure corresponding to a point in time at which the new key is put into effect.

Additionally, some embodiments are directed to an apparatus including memory and controlling circuitry constructed and arranged to carry out a method of managing data at rest within a data storage system.

Further, some embodiments are directed to a computer program product having a non-transitory computer readable storage medium that stores instructions which, when executed by a computer, cause the computer to carry out the method of managing data at rest within a data storage system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques of protecting data in a data storage system involve storing a data structure that associates indices with respective keys. In this data structure, each of the indices corresponds to a point in time when a respective key associated with that index was put into effect. Advantageously, the improved techniques allow for periodic updating of the keys without requiring expensive decryption/encryption operations on data at rest.

Figure 1:
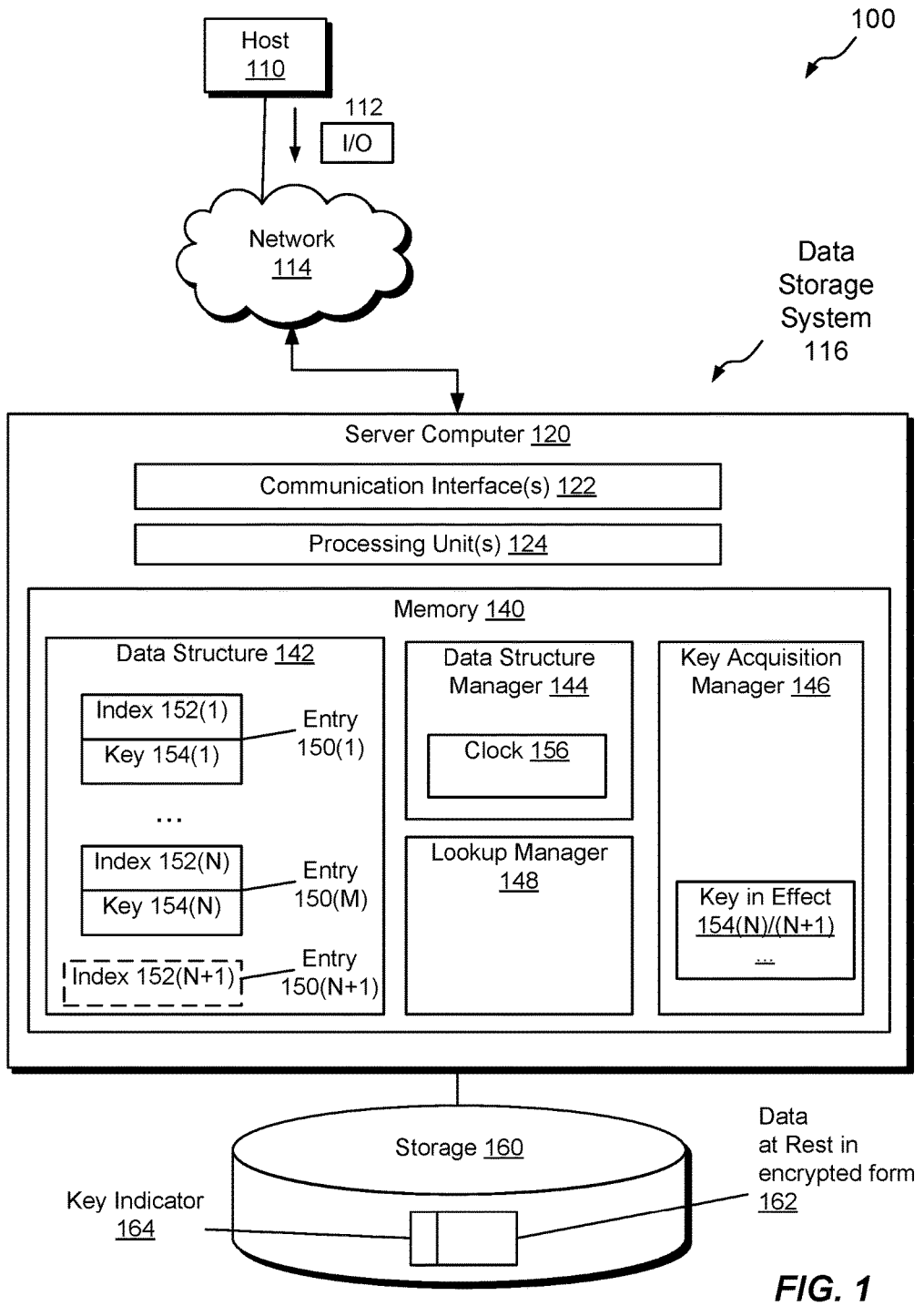
FIG. 1 is a block diagram illustrating an example electronic environment in which the improved techniques can be carried out.

FIG. 1 shows an example electronic environment 100 in which embodiments of the improved techniques hereof can be practiced. Here, electronic environment 100 includes host 110, electronic network 114, and data storage system 116. The data storage system 116 includes a server computer 120 coupled to storage 160, such as one or more magnetic disk drives, electronic flash drives, optical drives, and the like. In some examples, the drives are arranged in one or more RAID (Redundant Array of Independent/Inexpensive Disks) groups, Logical UNits (LUNs), and/or volumes.

In an example, the server computer 120 is implemented as a data mover, which is configured to read data from the storage 160 and to write data to the storage 160. The server computer 120 is in communication with the host 110 over the electronic network 114, e.g., for receiving IO requests 112 from host 110 specifying reads and/or writes to the storage 160. Although only a single host 110 is shown, it should be understood that the environment 100 may include many hosts 110, which may access the data storage system 116 in parallel.

The electronic network 114 provides a path for communications between the server computer 120 and the host 110. The electronic network 114 may implement any of a variety of protocols and topologies that are in common use for communications over the Internet or other networks. Further, the electronic network 114 may include various components (e.g., cables, switches/routers, gateways/bridges, etc.) that are used in such communications. The network 114 may further support block-based communication, using protocols such as Fibre Channel, iSCSI, and InfiniBand, for example.

The server computer 120 is seen to include one or more communication interfaces 122, a set of processing units 124, and memory 140. The communication interfaces 122 include, for example, Ethernet adapters, Fibre Channel targets, and the like, for converting electronic and/or optical signals received from the electronic network 114 to electronic form for use by the server computer 120. The set of processing units 124 include one or more processing chips and/or assemblies. The memory 140 includes both volatile memory (e.g., RAM), and non-volatile memory, such as one or more ROMs, disk drives, solid state drives, and the like. The set of processing units 124 and the memory 140 together form control circuitry, which is constructed and arranged to carry out various methods and functions as described herein.

The memory 140 includes a variety of software constructs realized in the form of executable instructions, such as data structure manager 144, key acquisition manager 146, and lookup manager 148. When the executable instructions are run by the set of processing units 124, the set of processing units 124 are caused to carry out the operations of the software constructs. Although certain software constructs are specifically shown and described, it is understood that the memory 140 typically includes many other software constructs, which are not shown, such as an operating system, various applications, processes, and daemons, for example. The memory 140 is also constructed and arranged to store various data. For example, memory 140 stores data structure 142.

The data structure 142 includes entries 150(1), ..., 150(N). The entries 150(1), ..., 150(N) associate indices 152(1), ..., 152(N) with respective keys 154(1), ... 154(N). Each of the indices, e.g., 152(1), corresponds to a point in time when the associated key, e.g., 154(1), was put into effect. Once put into effect, the key 154(1) is used to decrypt data that are (or were) stored in the data storage system 160 during a respective time interval. If the key 154(1) is symmetric, the key 154(1) is also used to encrypt data stored in the data storage system 116 during the same time interval. Otherwise, a separate key, which forms a complementary encryption/decryption key pair with the key 154(1), is used to encrypt data during that time interval. In this case, both keys in the key pair are put into effect at the same time. In some arrangements, the data structure 142 is implemented as a binary tree 240 (see FIG. 2).

The data structure manager 144 is a software construct configured to add a new entry 150(N+1) to the data structure 142 upon the acquisition of a new key 154(N+1). In an example, the data structure manager includes a clock 156. When the data structure manager 144 adds the new entry 150(N+1) to the data structure 142, the data structure manager 144 associates an index 152(N+1) that corresponds to the time according to the clock 156 at which the key 154(N+1) was acquired. This is merely an example, however, as the index need not be associated with time, but rather may be associated with any monotonically increasing value.

The key acquisition manager 146 is a software construct configured to obtain a new key 154(N+1) according to some specified rule, e.g., at periodic time intervals. For example, the key acquisition manager 146 may generate a new key according to an AES 256 scheme. In other arrangements, the key acquisition manager 146 may acquire a new key from an external source.

The lookup manager 148 is a software construct configured to locate a particular key based on a key indicator 164, which acts as an index. For example, the lookup manager 148 performs a lookup into data structure 142 to locate an entry whose index corresponds to the key indicator 164. In some arrangements, the key indicator 164 includes a timestamp corresponding to a time when data 162 was written and encrypted. For example, each time the server computer 120 writes data received from host 110, the server computer 120 encrypts the data using a current key in effect and stores the encrypted data 162 with a key indicator 164 that includes a current timestamp.

During example operation, the memory 126 contains a key in effect 154(N). The key in effect 154(N) is the key currently used to encrypt data contained in newly-arriving write requests, such as I/O request 112. In some arrangements, the key in effect 154(N) is part of a pair of keys, one used for encryption and the other for decryption, used in an asymmetric cryptography scheme. In other arrangements, key 154(N) may be used for both encryption and decryption as part of a symmetric encryption scheme.

At some point in time, the key acquisition manager 146 obtains a new key 154(N+1). For example, the key acquisition manager 146 generates the new key 154(N+1) using a random number generator. Alternatively, the key acquisition manager 146 acquires the new key 154(N+1) from an external source.

Figure 2:
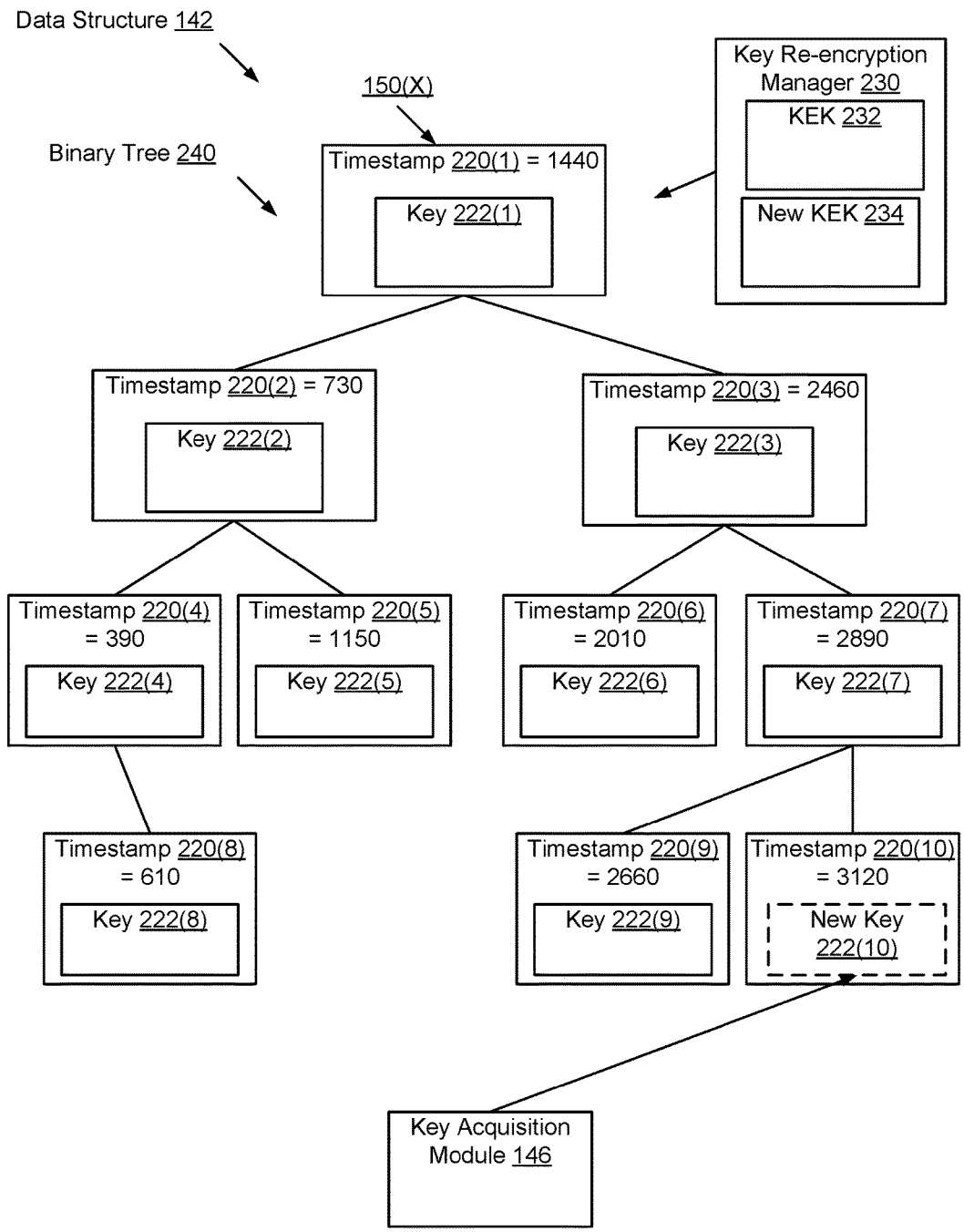
FIG. 2 is a block diagram illustrating an example binary tree within the electronic environment shown in FIG. 1.

In response to acquiring the new key, the server computer 120 creates a new entry 150(N+1) in the data structure 152. As illustrated in FIG. 1, the new entry 150(N+1) is appended to an end of the data structure 142. In some examples, however, the data structure 152 is implemented as a more efficient structure, such as with binary tree 240 (FIG. 2). As compared with a linear data structure 142, such as that shown in FIG. 1, which performs lookups in O(N), a binary tree can perform lookups in O(log(N)).

FIG. 2 illustrates an example of a data structure 142 implemented as binary tree 240. As illustrated in FIG. 2, each entry in the data structure 142 corresponds to a node of the binary tree. The entry 150(1) is the root of the binary tree.

Each entry, e.g., 150(X) in the binary tree 240 contains a timestamp 220(1). The timestamp 220(1) indicates a point in time at which the corresponding key 222(1) was put into effect in the data storage system 116. Entry 150(X) also includes an instance of the key 222(1), which corresponds to the key in effect at the time indicated by the timestamp 220(1). In some examples, the binary tree 240 associates the timestamp 220(1) with the entry 150(X), e.g., using some other data structure, but does not store the timestamp 220(1) with the entry itself. Many arrangements are contemplated.

The binary tree 240 is arranged so that child nodes shown to the left have a timestamp less than the timestamp of the parent node (indicating an earlier time) and child nodes shown to the right of the node have a timestamp greater than the timestamp of the parent node (indicating a later time). As illustrated in FIG. 2, the timestamp 220(1) has a value of 1440. The timestamp 220(2) of the left child node is 730, while the timestamp 220(3) of the right child node has a value of 2460. The children of each of these child nodes each have timestamps that satisfy similar relationships. For example, the left child of the left child has a timestamp 220(4) of 390 and the right child of the left child has a timestamp 220(5) of 1150. The left child of the right child has a timestamp 220(6) with value 2010 and the right child of the right child has a timestamp 220(7) with value 2890. The children of these nodes are shown in FIG. 2 as the leaf nodes of the binary tree 240 with timestamps 220(8) and 220(9).

When the key acquisition manager 146 obtains a new key, e.g., 222(10), the server computer 120 creates a new node in the binary tree 240. The timestamp 220(10) of this node corresponds to a current time, which is later than any other time indicated by the timestamps 220(1), . . . , 220(9) in the binary tree 240. Thus the natural place for the server computer 120 to add the new node would be as a child of the rightmost leaf node of the binary tree, in this case, having timestamp 220(7).

However, after repeated additions of new nodes of the binary tree 240 as children of the rightmost leaf node, the binary tree 240 eventually resembles an array with an O(N) lookup operation rather than an O(log(N)) lookup operation. Thus, the binary tree 240 is preferably rebalanced. For example, the binary tree 240 may be implemented as an AVL tree. In an example, the data structure manager 144 performs rebalancing operations upon creation of each new node, or after creation each instance of some number of nodes. In this way, the lookup manager 146 is enabled to maintain its ability to locate a key in the binary tree 240 at or near O(log(N)) operations.

In some arrangements, the keys 222(1), . . . , 222(10) are stored in their respective nodes as plain text. However, in other arrangements, the keys 222(1), . . . , 222(10) are stored in encrypted form, for providing additional security for the data at rest. FIG. 2 shows a key re-encryption manager 230, which contains a key encryption key (KEK) 232. The KEK is a cryptographic key used to encrypt the plain text from which each key 222(1), . . . , 222(10) is constructed. Upon storage of each key, e.g., key 222(1), in a node of the binary tree 240, the server computer 120 encrypts the key using a KEK currently in effect, e.g., KEK 232. The same KEK 232 may also be used to decrypt the key 222(1), i.e., when the key 222(1) is needed for decryption operations. Thus, in an example, the KEK 232 may be a symmetric key. In some arrangements, the host 110 is provided with a copy of the KEK 232 and may use the KEK 232 when sending I/O requests 112.

To promote even further security, the key re-encryption manager 230 updates the KEK 232 with a new KEK 234. This may be done periodically, e.g., on a schedule, in an ad hoc manner, or in any other manner. To update KEK 232 with new KEK 234, the key re-encryption manager 230 decrypts each of the keys 222(1), . . . , 222(10) using KEK 232. The key re-encryption manager 230 then re-encrypts the plain text of each of the keys 222(1), . . . , 222(10), with the new KEK 234, stores the re-encrypted keys, and discards the KEK 232 from memory 140. The original KEK 232 can then be discarded. It should be appreciated that changing the KEK and re-encrypting the keys in the binary tree 240 effectively re-encrypts all of the data at rest in the data storage system 116. However, the scope of such re-encryption is very small, as only the keys in the binary tree 240 are re-encrypted rather than all the data in the data storage system 116.

With the binary tree 240 so arranged, the server computer 120 may effect write and read operations that include respective encryption and decryption operations on data at rest in storage 160. Examples of such operations are described in FIGS. 3 and 4.

Figure 3:
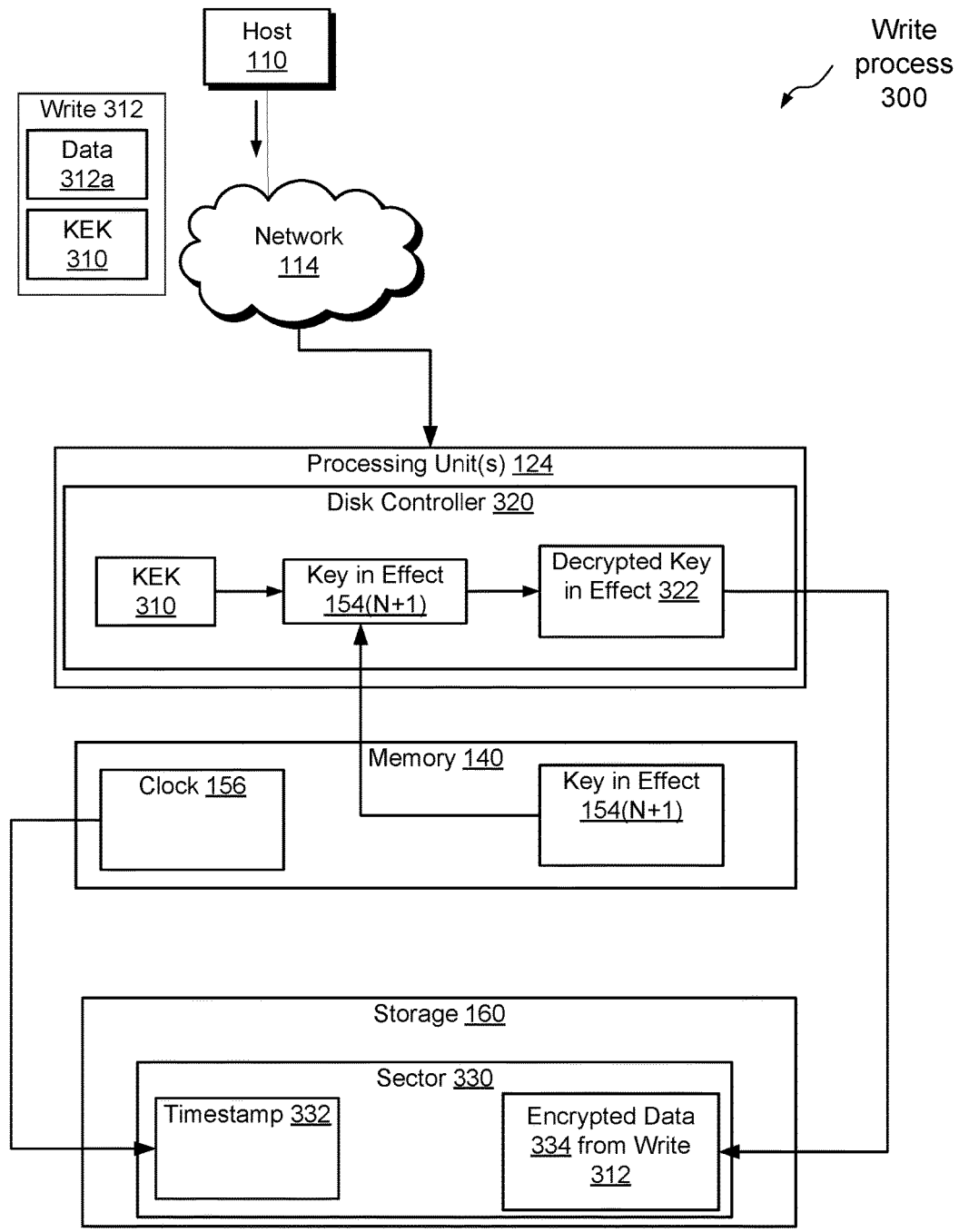
FIG. 3 is a block diagram illustrating an example arrangement for writing data within the electronic environment shown in FIG. 1.

FIG. 3 illustrates an example write process 300 within the electronic environment 100. During the write process 300, an application running on the host 110 sends a write request 312 to the server computer 120. Along with data 312a to be written, the write request 312 also contains a KEK 310 for decrypting the encryption key 154(N+1).

In an example, upon receiving the write request 312, the server computer 120 accesses the key in effect 154(N+1) from memory 140. The server computer 120 uses the KEK 310 to decrypt the key in effect 154(N+1) to reveal a plain text version of key in effect 322. The server computer 120 then uses the plain text version to encrypt the data 112a provided with the write request 312, thereby producing encrypted data 334.

At about the same time that the server computers 120 receives the write request 312, the server computer 120 also generates a timestamp 332. The server computer 120 then stores the timestamp 332 together with the encrypted data 334 in the storage 160.

In an example, the server computer 120 includes a disk controller 320, which controls a disk drive in the storage 160. The disk drive (not shown) may include many sectors, where each sector is 512 Bytes, for example. Here, the disk controller 320 may store the timestamp 332 and the encrypted data 334 together in a single sector 330. More generally, when executing writes, the disk controller 320 stores encrypted data in sectors with associated timestamps. Thus, each sector that stores encrypted data also stores an associated timestamp, and that timestamp may be used as an index into the binary tree 240, for locating a corresponding decryption key for decrypting the data stored in that sector.

It should be understood that the timestamp may be expressed in any particular format. In some arrangements, the timestamp is a 64-bit string that represents a time starting from some initial time of the server computer (e.g., first boot) with microsecond increments. Other timestamps may represent time in more coarse or fine increments. In addition, it is not strictly required that timestamps be used, per se. For instance, any monotonically increasing number may be used. Such a number may be incremented each time a new entry is added to the binary tree 240, and a current value of that number may be used as a key indicator 164 in sectors whenever new data are stored.

Figure 4:
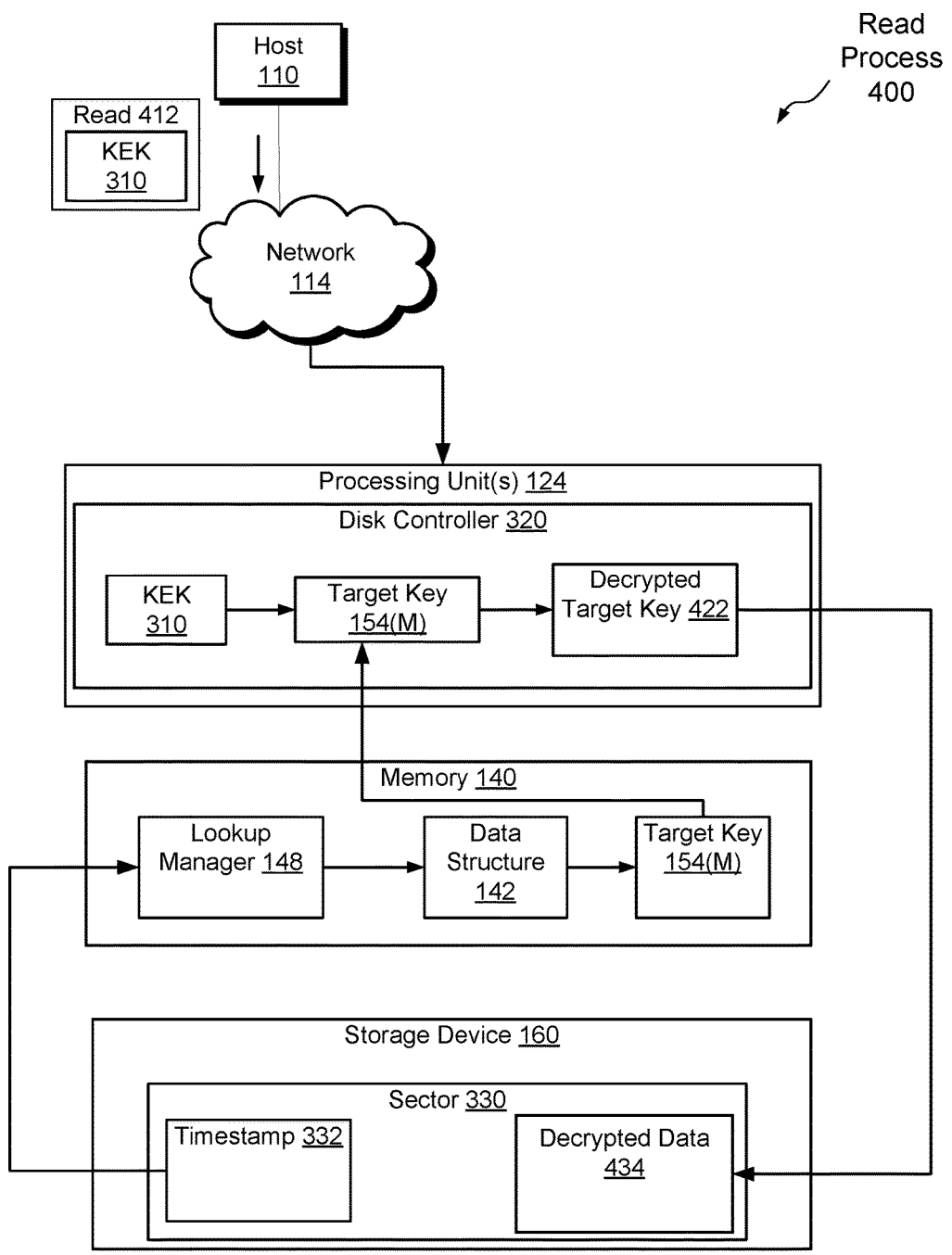
FIG. 4 is a block diagram illustrating an example arrangement for reading data within the electronic environment shown in FIG. 1.

FIG. 4 illustrates an example read process 400 within the electronic environment 100. During the read process 400, an application running on the host 110 sends a read request 412 to the server computer 120. The request specifies (or implies) an address to be read from the storage 160 and includes the KEK 310. Upon receiving the receiving the request 412, the server computer 120 accesses the address to be read from the storage 160.

For example, the disk controller 320 identifies the sector 330 from which the data is to be read. From that sector 330, the disk controller 320 obtains the timestamp 332 (or other number) stored with the data 334 in that sector 330. The disk controller 320, via the lookup manager 148, then uses the timestamp 332 to perform a lookup operation on the binary tree 240.

In an example, the lookup operation includes traversing the binary tree 240, e.g., starting from the root node of the binary tree 240, to identify a matching node. For example, suppose that the timestamp 332 is "410." The lookup manager 148 compares the value 410 to the timestamp 220(1) in the root node and finds that the timestamp 332 is less than the timestamp 220(1). Thus, the lookup manager traverses to the left child of the root node. Through another comparison, the lookup manager 148 finds that the timestamp 332 is also less than the timestamp 220(2) and traverses to the left child of that node. Finally, the lookup manager 148 finds that the timestamp 332 is greater than the timestamp 220(4) of the left child and, as a result, selects as the target key 154(M), the associated key 222(4).

Once the lookup manager 148 identifies the target key 154(M), the disk controller 320 decrypts the target key 154(M) using the KEK 310 to produce the plain text key 422. Using the plain text key 422, the disk controller 320 decrypts the data 334 stored in the sector 330 and presents the resulting plain text data 334 to the host 110 to satisfy the request 412.

Figure 5:
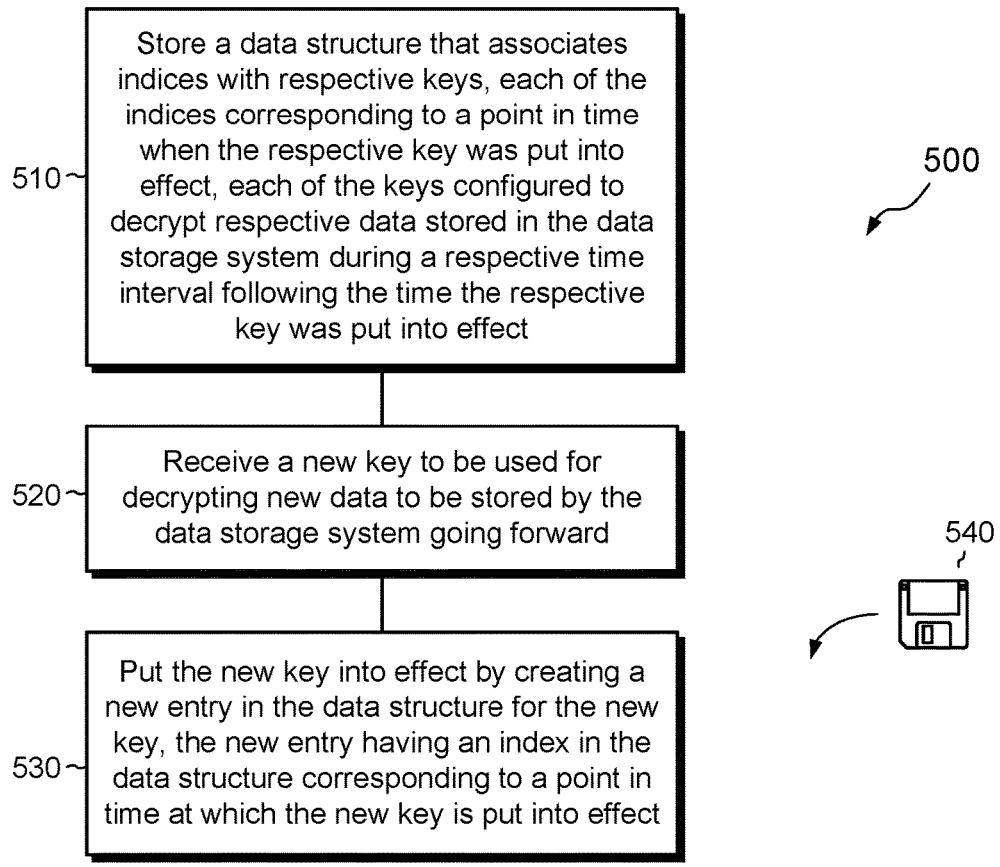
FIG. 5 is a flow chart illustrating an example method of processing the write requests within the electronic environment shown in FIG. 1.

FIG. 5 illustrates an example method 500 of managing data at rest within a data storage system. The method 500 may be performed by the software constructs described in connection with FIG. 1, which reside in the memory 140 of the server computer 120 and are run by the set of processing units 124.

At 510, a data structure that associates indices with respective keys is stored in memory. Each of the indices 152(1), ..., 152(N) corresponds to a point in time when the respective key was put into effect. Each of the keys 154(1), ..., 154(N) is configured to decrypt respective data stored in the data storage system 116 during a respective time interval following the time the respective key was put into effect.

At 520, a new key 154(N+1) is received. The new key is to be used for decrypting new data to be stored by the data storage system going forward.

At 530, the new key 154(N+1) is put into effect by creating a new entry 150(N+1) in the data structure for the new key 154(N+1). The new entry 150(N+1) has an index 152(N+1) in the data structure corresponding to a point in time at which the new key 154(N+1) is put into effect Improved techniques have been described for protecting data in a data storage system involve storing a data structure in a data storage system that associates indices with respective keys. In this data structure, each of the indices corresponds to a point in time when a respective key associated with that index was put into effect. Advantageously, the improved techniques allow for periodic updating of the keys without performing expensive decryption/encryption operations on the data at rest.

Having described certain embodiments, numerous alternate embodiments or variations can be made. For example, data structures other than binary trees may be used. Also, monotonically increasing numbers besides timestamps may be used for indices 152(1) to 152(N+1).

One should appreciate that the above-described techniques are directed to a technological solution, namely that of providing cryptographic security to data at rest. For example, the improvement lies in the ability to avoid expensive cryptographic operations when updating keys by storing previous keys in a data structure in which keys may be identified using a key indicator stored with the encrypted data. The improved techniques thus promote improvements in the efficiency of the data storage system 116. In doing so, the improved techniques also improve the efficiency of host 110, as the data storage system 116 is able to respond more quickly to I/O requests than it would if the data storage system 116 were busy decrypting and encrypting large amounts of data Thus, applications running on the host 110 will run with fewer delays, and users of such host applications will enjoy an improved user experience.

In some arrangements, the improvements hereof may be realized in the form of a computer program product 540. For example, the operations described herein may be defined by executable instructions stored in a set of non-transient, computer-readable media. When the executable instructions are run by the server computer 120, the server computer 120 is caused to carry out the operations define by the executable instructions. Examples of suitable computer-readable storage media include tangible articles of manufacture and apparatus such as CD-ROM, flash memory, disk memory, tape memory, and the like.

While various embodiments of the invention have been particularly shown and described, it will be understood by those skilled in the art that various changes in form and details may be made therein without departing from the spirit and scope of the invention as defined by the appended claims.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is intended to be set forth in this document.

What is claimed is:

1. A method of managing data at rest within a data storage system, the method comprising:

storing a data structure that associates indices with respective keys, each of the indices corresponding to a point in time when the respective key was put into effect, each of the keys configured to decrypt respective data stored in the data storage system during a respective time interval following the time the respective key was put into effect;

receiving a new key to be used for decrypting new data to be stored by the data storage system going forward; and putting the new key into effect by creating a new entry in the data structure for the new key, the new entry having an index in the data structure corresponding to a point in time at which the new key is put into effect, the method thereby enabling the data storage system to decrypt data at rest with different keys over time, wherein the method further comprises:

receiving a request from a host application to read a set of data, an encrypted version of the set of data stored at a specified location in the data storage system;

in response to receiving the request to read the set of data, obtaining a key indicator stored with the encrypted version of the set of data at the location in the data storage system;

performing a lookup operation on the data structure, the lookup operation using the key indicator to find a matching entry that has an index corresponding to a point in time at which a target key for decrypting the encrypted version of the set of data is put into effect; and decrypting the encrypted version of the set of data using the target key to produce the set of data.

2. A method as in claim 1, further comprising:

receiving a request to write a new set of data to the data storage system;

in response to receiving the request to write the new set of data, obtaining a key for encrypting the new set of data and a key indicator indicative of a point in time at which the request to write the new set of data was received;

encrypting the set of data using the key to produce an encrypted version of the new set of data; and writing the encrypted version of the new set of data with the key indicator to a location within the data storage system.

3. A method as in claim 2, wherein the data storage system includes a disk, the disk including a sector, and wherein writing the encrypted version of the new set of data with the key indicator to the location within the data storage system includes writing the new data with the key indicator to the sector of the disk.

4. A method as in claim 2, wherein a key for decrypting the encrypted version of the new set of data is a symmetrical key, which is also the key for encrypting the new set of data.

5. A method as in claim 1,
wherein the data structure is a binary tree having multiple nodes,
wherein the entry of the data structure is a node of the binary tree, and
wherein creating the new entry in the data structure for the new key includes writing the new key in a node of the binary tree.

6. A method as in claim 5,
wherein the key indicator includes a timestamp indicating a point in time at which a request to write the set of data to the data storage system was received, and
wherein performing the lookup operation on the data structure includes traversing the binary tree using the timestamp to locate a node whose index corresponds to the latest point in time prior to the point in time indicated by the timestamp.

7. A method as in claim 5, further comprising, in response to creating the new entry, performing a balancing operation on the binary tree, the balancing operation reducing a number of levels of the binary tree.

8. A method as in claim 1, further comprising:
encrypting the target key using a key encryption key (KEK) to produce an encrypted version of the target key, the encrypted version of the target key being stored in the data structure; and
prior to decrypting the encrypted version of the set of data using the target key, decrypting the target key using the KEK.

9. A method as in claim 8, wherein the KEK is a first KEK, and wherein the method further comprises:
for each of the entries of the data structure, decrypting the respective key using the first KEK;
obtaining a second KEK different from the KEK; and
for each of the entries in the data structure, encrypting the respective key using the second KEK.

10. A method as in claim 1, further comprising:
storing, by the data storage system, multiple sets of data in encrypted form, each of the multiple sets of data stored in a respective disk sector; and
storing, in each respective disk sector, a respective key indicator, each respective key indicator providing an index into the data structure for locating an encryption key for decrypting the set of data stored in the respective disk sector.

11. A computer program product including a non-transitory, computer-readable storage medium that stores executable code, which when executed by a computer, causes the computer to perform a method of managing data at rest within a data storage system, the method comprising:

storing a data structure that associates indices with respective keys, each of the indices corresponding to a point in time when the respective key was put into effect, each of the keys configured to decrypt respective data stored in the data storage system during a respective time interval following the time the respective key was put into effect;

receiving a new key to be used for decrypting new data to be stored by the data storage system going forward; and putting the new key into effect by creating a new entry in the data structure for the new key, the new entry having an index in the data structure corresponding to a point in time at which the new key is put into effect, the method thereby enabling the data storage system to decrypt data at rest with different keys over time, wherein the method further comprises:
receiving a request from a host application to read a set of data, an encrypted version of the set of data stored at a specified location in the data storage system;
in response to receiving the request to read the set of data, obtaining a key indicator stored with the encrypted version of the set of data at the location in the data storage system;
performing a lookup operation on the data structure, the lookup operation using the key indicator to find a matching entry that has an index corresponding to a point in time at which a target key for decrypting the encrypted version of the set of data is put into effect; and
decrypting the encrypted version of the set of data using the target key to produce the set of data.

12. A computer program product as in claim 11, further comprising:
receiving a request to write a new set of data to the data storage system;
in response to receiving the request to write the new set of data, obtaining a key for encrypting the new set of data and a key indicator indicative of a point in time at which the request to write the new set of data was received;
encrypting the set of data using the key to produce an encrypted version of the new set of data; and
writing the encrypted version of the new set of data with the key indicator to a location within the data storage system.

13. A computer program product as in claim 12, wherein the data storage system includes a disk, the disk including a sector, and
wherein writing the encrypted version of the new set of data with the key indicator to the location within the data storage system includes writing the new data with the key indicator to the sector of the disk.

14. A computer program product as in claim 12, wherein a key for decrypting the encrypted version of the new set of data is a symmetrical key, which is also the key for encrypting the new set of data.

15. A computer program product as in claim 11,
wherein the data structure is a binary tree having multiple nodes,
wherein the entry of the data structure is a node of the binary tree, and
wherein creating the new entry in the data structure for the new key includes writing the new key in a node of the binary tree.

16. A computer program product as in claim 15,
wherein the key indicator includes a timestamp indicating a point in time at which a request to write the set of data to the data storage system was received, and
wherein performing the lookup operation on the data structure includes traversing the binary tree using the timestamp to locate a node whose index corresponds to the latest point in time prior to the point in time indicated by the timestamp.

17. A computer program product as in claim 11, wherein the method further comprises:
encrypting the target key using a key encryption key (KEK) to produce an encrypted version of the target key, the encrypted version of the target key being stored in the data structure; and
prior to decrypting the encrypted version of the set of data using the target key, decrypting the target key using the KEK.

18. A computer program product as in claim 17, wherein the KEK is a first KEK and wherein the method further comprises:
for each of the entries of the data structure, decrypting the respective key using the first KEK;
obtaining a second KEK different from the KEK; and
for each of the entries in the data structure, encrypting the respective key using the second KEK.

19. An electronic apparatus comprising memory and controlling circuitry coupled to the memory, the controlling circuitry being constructed and arranged to:
store a data structure that associates indices with respective keys, each of the indices corresponding to a point in time when the respective key was put into effect, each of the keys configured to decrypt respective data stored in the data storage system during a respective time interval following the time the respective key was put into effect;
receive a new key to be used for decrypting new data to be stored by the data storage system going forward; and
put the new key into effect by creating a new entry in the data structure for the new key, the new entry having an index in the data structure corresponding to a point in time at which the new key is put into effect,
the controlling circuitry thereby enabling the data storage system to decrypt data at rest with different keys over time,
wherein the control circuitry is further constructed and arranged to:
receive a request from a host application to read a set of data, an encrypted version of the set of data stored at a specified location in the data storage system;
in response to receiving the request to read the set of data, obtain a key indicator stored with the encrypted version of the set of data at the location in the data storage system;
perform a lookup operation on the data structure, the lookup operation using the key indicator to find a matching entry that has an index corresponding to a point in time at which a target key for decrypting the encrypted version of the set of data is put into effect; and
decrypt the encrypted version of the set of data using the target key to produce the set of data.

\* \* \* \* \*